United States Patent [19]

Menshutin et al.

[11] 4,205,030

[45] May 27, 1980

[54] METHOD FOR EXTRUSION OF HIGHLY VISCOUS THERMOSETTING MATERIAL

[76] Inventors: Vasily P. Menshutin, Proletarsky prospekt, 72, korpus 3, kv. 131; Modest S. Akutin, B. Tishinksy pereulok, 26, korpus 16, kv. 16, both of Moscow; Nikolai V. Iovdalsky, ulitsa Stepnaya, 45, Krasnodar; Alla N. Minakova, Komsomolsky bulvar, 46, kv. 171, Zhdanov; Evgeny R. Zherebtsov, poselok Tuchkovo, ulitsa Partizan, 31, kv. 101, Moskovskaya oblast, Ruzsky raion; Anatoly D. Sokolov, Molodezhnaya ulitsa, 4, kv. 109; Vsevolod V. Abramov, Poklonnaya ulitsa, 2, kv. 4, both of Moscow; Galina D. Melekhova, Pravolineinaya ulitsa, 26, Moskovskaya oblast, stantsia Bykovo; Alexandr N. Ustkachkintsev, ulitsa Kozlova, 11, kv. 29, Moskovskaya oblast, Orekhove-Zuevo, all of U.S.S.R.

[21] Appl. No.: 905,953

[22] Filed: May 15, 1978

[51] Int. Cl.$^2$ .......................... B29F 3/01; B29G 2/00
[52] U.S. Cl. .................................. 264/40.1; 264/40.4; 264/40.7; 264/141; 264/176 R; 264/211
[58] Field of Search ................. 264/140–143, 264/211, 176 R, 209, 40.1, 40.7, 40.4

[56] References Cited

U.S. PATENT DOCUMENTS

| | | | |
|---|---|---|---|
| 2,309,342 | 1/1943 | Dent et al. | 264/141 |
| 2,857,624 | 10/1958 | Hanzel et al. | 264/141 |
| 3,066,356 | 12/1962 | Porter | 264/211 |
| 3,387,073 | 6/1968 | Larsen | 264/211 |
| 3,492,310 | 1/1970 | Carrow | 264/211 |
| 3,665,068 | 5/1972 | Duling et al. | 264/211 |
| 4,056,592 | 11/1977 | Izumi et al. | 264/141 |

*Primary Examiner*—Jeffrey R. Thurlow
*Attorney, Agent, or Firm*—Steinberg and Blake

[57] ABSTRACT

A method for extrusion of a highly viscous thermosetting or a thermoplastic material comprising extrusion of said material in the presence of substances diminishing external friction of the melt, at a ratio between internal and external friction values of the material melt within the range of from 1.5 to 4.0; the thermosetting material melt viscosity being ranged from $50 \times 10^6$ to $300 \times 10^6$ poises, while the thermoplastic material melt index being varied from 0.01 to 0.1 g/10 min.

The ratio between internal and external friction values of the material melt is maintained within the above-specified range by way of incorporation, into the starting thermosetting or thermoplastic material, of certain compounds. For thermosetting materials, use is made of, e.g. zinc dialkyldithiophosphate, and for thermoplastic materials barium sulphonate is used as such a compound.

The extrusion method according to the present invention makes it possible to perform granulation of a thermosetting material so that the resulting granules are not subjected to a premature curing, agglomeration upon storage and can be processed into articles by any conventional method. In the extrusion-moulding of thermoplastic materials the final shaped articles do not substantially swell or change their shape. Furthermore, the method according to the present invention makes it possible to increase the product output due to an increase of the extrusion speed to 300 m/min.

8 Claims, No Drawings

METHOD FOR EXTRUSION OF HIGHLY VISCOUS THERMOSETTING MATERIAL

FIELD OF APPLICATION OF THE INVENTION

The present invention relates to processing of polymer materials and, more specifically, it relates to processes for extrusion of a highly viscous thermosetting or a thermoplastic material.

Processing of a polymer material by the extrusion method stipulates production of either final articles or granules suitable for a further processing. The extrusion method involves melting of the material and forcing of the melt through a die means to produce either granules or final articles. The use of polymer materials in the granulated form has certain advantages. Granules enable an accurate metering due to a good flowability; they also contribute to better labor conditions due to substantially reduced dusting of production premises.

At the present time granulation of thermosetting composite materials is a great technical problem, despite the availability of certain methods for the manufacture of thermosetting granulated materials.

BACKGROUND OF THE INVENTION

Processing of thermosetting materials by methods of injection-moulding or compression-moulding with a pre-plastication with a screw imposes tightened requirements on the invariability of their granulometric composition.

Manufacture of granulated composite thermosetting plastics is performed in two ways, namely: either during production of composite materials or thereafter, i.e. before processing to articles.

Known in the art is a method of granulation of thermosetting plastics by extrusion which comprises melting melamine or phenolic resins in an extruder and extrusion of the resulting melt through a grate at a temperature within the range of from 80° to 100° C.; the thus-produced strands are cut to granules of a predetermined size.

However, the difficulties associated therewith due to a high accuracy of maintaining temperature conditions substantially hinder the extrusion process. Furthermore, the resulting granules do not possess sufficiently good injection-moulding properties.

"Werner Pfleiderer", a West German company, has attempted to overcome this disadvantage by developing a continuous process for the manufacture of a thermosetting composite material and granulation thereof by extrusion. In this process the starting mass is melted, homogenized and partly condensed, whereafter it is added with an "agent" stopping the condensation reaction and lowering the product viscosity. As such "agent" water is used in an amount of from 0.5 to 8.0% by weight.

It is also known, however, that the addition of water into a composite thermosetting material impairs dielectric and physico-mechanical properties of articles further manufactured from this material.

In the extrusion of a thermoplastic material the rate of outflow of the extrudate is limited by the formation of various defects on the surface thereof which result in an impaired appearance of the final articles. Furthermore, great difficulties are encountered in extrusion processing of high-viscosity thermoplastic materials.

Known in the art is a process for the manufacture of articles from thermoplastics such as polyolefins with the melt index of 0.3 g/10 minutes which involves intermixing of the polymer with a lubricating agent and subsequent extrusion in a piston extruder. The process of the manufacture of final moulded articles is performed in the following manner. Granules of a polymer material from a charging bin are fed into an extrusion channel, wherein said granules are softened under the effect of temperature and become molten and then, while passing via cooling zone, are moulded into articles. Mouldability of the thermoplastic material in this case is ensured by the addition of lubricating agents thereinto such as glycerol with amides of higher aliphatic acids. This prior art process however, has certain disadvantages residing in a low moulding productivity (the outflow rate of a final article ranges only from 0.15 to 0.64 m/min) and a low degree of densification of the material in the forming die which results in an impaired quality of the final article. Moulding of highly extended thermoplastics or thermoplastics containing a large amount of a gel-like fraction is totally impossible to perform using this method, i.e. extrusion, even with the addition of lubricating agents.

OBJECT OF THE INVENTION

It is an object of the present invention to provide a method for extrusion of polymeric, and especially highly viscous thermosetting and thermoplastic materials of a high viscosity which would make it possible to obtain granules or shaped articles at a high speed and substantially avoid premature curing of the material during granulation so as to ensure a good mouldability of the resulting granules in their further processing to articles.

BRIEF SUMMARY OF THE INVENTION

The present method for extrusion of a thermosetting or a thermoplastic material in accordance with the present invention resides in that the extrusion of said material is performed in the presence of substances diminishing external friction of the melt, at a ratio between internal and external friction values of a melt of the material within the range of between 1.5 to 4.0 and at a rate of 20 to 300 m/min; in doing so, a melt viscosity of the thermosetting material should vary from $50 \times 10^6$ to $300 \times 10^6$ poises and a melt index of the thermoplastic material should range from 0.01 to 0.1 g/10 minutes.

The method according to the present invention makes it possible to produce, from thermosetting materials, granules capable of being processed into articles by various conventional techniques.

The resulting articles from this granulated material have high physico-mechanical and dielectric properties.

The method according to the present invention also makes it possible to manufacture, from thermoplastic materials various shaped articles such as pipes, sheets at an increased extrusion speed and with a good quality of their surface.

As it has been already mentioned hereinabove, the ratio between internal and external friction values of the melt should vary within the range of from 1.5 to 4.0. Lowering this ratio below 1.5 will result in an impaired surface quality of the extrudate due to an increased adherence of the melt to the material of the extrusion equipment. Increasing said ratio above 4.0 necessitates the use of very high pressures in the extrusion, i.e. forces required to push the material through the forming die. This ratio is decisive, since it permits the conduction of the process under the conditions of by-wall gliding of the material melt along inner working surfaces of the extrusion equipment. Movement of the material in the extruder and in the forming die in this case occurs in the form of a non-strained plug which means that the speeds of the material movement in the regions adjacent to the equipment walls and the speeds of the material within its bulk are approaching each other or equal. This condition enables the performance of the extrusion of said materials at increased speeds ranging from 20 to 300 m/min; moreover, at a speed below 20 m/min near-the wall sliding conditions cannot be ensured.

Viscosity of the starting thermosetting material should be within the range of from $50 \times 10^6$ to $300 \times 10^6$ poises. This viscosity range should be kept so as to maintain the abovementioned ratio between internal and external friction values of the melt within the specified range.

Melt index of the starting thermoplastic material should vary from 0.01 to 0.1 g/10 min. This is also necessary to maintain said ratio between internal and external friction values of the melt within the range specified hereinabove. The term "melt index" as used herein means a mass of the polymer (grams) extruded via a standard viscosimeter capillary at the temperature of 190° C. under the load of 2.16 kgf over the period of the outflow of 10 minutes. Standard dimensions of the capillary are as follows: length $8.000 \pm 0.025$ mm; diameter $2.095 \pm 0.005$ mm; inner diameter of the viscosimeter barrel is $9.54 \pm 0.016$ mm.

In accordance with the present invention, extrusion of a thermosetting material is performed at a temperature within the range of from 90° to 110° C. At a temperature below 90° C. the material is not totally melted, wherefore the material is not fully homogenized thus hampering the extrusion process. On the other hand, at a temperature above 110° C. a deep progress of the condensation reaction is possible along with transition of the material into a non-fusible state thus resulting in the impossibility of extrusion.

In accordance with the present invention, extrusion of a thermoplastic material is conducted at a temperature within the range of from 140° to 170° C. At a temperature below 140° C. the material has a very high viscosity, wherefore its extrusion necessitates the use of high pressures. Increasing temperature above 170° C. results in violation of the above-mentioned ratio between internal and external friction values of the material melt.

In accordance with the present invention extrusion of the material is performed with the addition thereinto of a compound lowering an adhesive interaction of its melt with the surface of the extrusion equipment in an amount ensuring the above-specified ratio between internal and external friction of the melt.

As such compounds for extrusion of thermosetting materials use is made of the following ones: zinc dialkyldithiophosphate (wherein the alkyl contains 4 to 8 carbon atoms) in an amount of from 0.5 to 2.5% by weight; a mixture of zinc dialkyldithiophosphate and epoxystearic acid 2-ethylhexylate in a ratio of 20–50:80–50 in an amount of from 0.5 to 2.5% by weight; a mixture of zinc dialkyldithiophosphate and polyhydroxypropylene glycol in a ratio of 30–50:70–50 in an amount of from 0.5 to 2.5% by weight.

In extrusion of thermoplastic materials use is made of such compounds as the following ones: barium sulphonate in an amount of from 0.5 to 2.0% by weight or calcium sulphonate in an amount of from 0.5 to 2.0% by weight.

The method for extrusion according to the present invention makes it possible to perform granulation of a thermosetting material without any undesirable premature curing of the resulting granules.

This advantage of the extrusion method according to the present invention can be explained by the fact that the found ratio between internal and external friction values substantially eliminates shear deformation of the melt layers relative to each other, wherefore there is no considerable heating of the material which usually results in its premature curing. Besides, heat emission associated with external friction of the material melt with the surface of the moulding die is also reduced. This makes it possible to increase the extrudate speed of outflow up to 300 m/min and thus substantially increase the process productivity.

The resulting granules have a regular cylindrical shape, they do not agglomerate upon storage and can be processed by any conventional method such as injection-moulding or compression-moulding. The manufacture of granules in accordance with the present invention is not accompanied by dusting, wherefore the risk of explosion is minimized and the labour conditions are improved.

The method according to the present invention makes it possible to perform extrusion of a thermoplastic material, both extended and non-extended, and a partly cross-linked polymer, e.g. a thermoplastic material which was already in use. In doing, so, the final shaped articles are not likely to undergo undesirable swelling or shape deformation. This advantage of the extrusion method according to the present invention can be explained by the fact that the found ratio between internal and external friction values of the material melt diminishes the role of a shear component of the strain during outflow of the material melt and normal stresses associated therewith responsible for the swelling value of the extrudate.

All this makes it possible to increase the speed of outflow of the extrudate up to 300 m/min while retaining a good quality thereof; this, in turn, provides for a higher productivity of the process with a simultaneous decrease of the processing temperature by 30°–50° C. compared to the temperature employed in conventional extrusion methods thus substantially reducing power consumption for extrusion.

Detailed Description of the Invention

The process according to the present invention is practically embodied in the following manner.

First the starting viscosity (in the case of a thermosetting material) and melt index (for a thermoplastic material) is determined. Viscosity of a thermosetting material is determined by means of a rotary viscosimeter of the "cylinder—cylinder" type at a temperature of 120° C. and shear velocity of $0.014 \sec^{-1}$ and pressure of 300 kg/cm². Viscosity of the melt of the thermosetting material to be extruded must range within $50 \times 10^6$ to $300 \times 10^6$ poises.

If the viscosity of the initial material does not lie within said range, it can be adjusted to the required value by mixing the initial material with a material having the same composition but a higher or lower viscosity. For thermoplastic materials the melt index is determined, which must range within 0.01 g/10 min to 0.1 g/10 min.

If the melt index of the initial polymer exceeds 0.1 g/10 min, it is lowered by adding a filler or by additional cross linking by either chemical or physical methods.

After determining the above values, the ratio of the internal and external friction of the melt is determined on a rotary viscosimeter of the "cylinder-cylinder" type with the use of a ribbed (internal friction) and smooth (external friction) rotating barrels. This ratio is determined by the ratio between torque values of the ribbed and smooth barrels at the speed of their rotation of 50 r.p.m. and at the temperature of 120° C. for thermosetting plastics and 160° C. for thermoplastic materials. Said ratio between internal and external friction values should be within the range of from 1.5 to 4.0. If a material has this friction ratio, it is directly fed to extrusion; if a material does not satisfy this requirement, the required value of said ratio is ensured by way of addition, into the starting material, of compounds reducing adherence of its melt to the extrusion equipment surface. In the case of extrusion of thermosetting material these are added with zinc dialkyldithiophsophate in an amount of from 0.5 to 2.5% by weight or a mixture of zinc dialkyldithiophosphate with epoxystearic acid 2-ethylhexylate in a ratio of 20–50:80–50 in an amount of from 0.5 to 2.5% by weight or a mixture of zinc dialkyldithiophsophate with polyhydroxypropylene glycol in a ratio of 30–50:70–50 in an amount of from 0.5 to 2.5% by weight.

In extrusion of thermoplastic materials, the latter are added with barium sulphonate in an amount of from 0.5 to 2.0% by weight or calcium sulphonate in an amount of from 0.5 to 2.0% by weight.

The amount of the compound to be added is selected in accordance with viscosity or melt index of the material melt.

Said compounds may be added into the material either in the process of its preparation, or directly prior to its extrusion.

All the above-mentioned compounds are known in the art. Zinc dialkyldithiophosphate, barium and calcium sulphonates are available from petrochemical synthesis. Polyhydroxypropylene glycol is prepared by polymerization of hydroxypropylene glycol, while epoxystearic acid 2-ethylhexylate is prepared by epoxydation of an etherification product of oleic acid and 2-ethylhexanol.

After addition of the above-mentioned compound, the ratio between internal and external friction values is controlled by means of a rotary viscosimeter of the above-specified "cylinder-cylinder" type within the range of from 1.5 to 4.0 in accordance with the present invention.

Extrusion can be performed both in a piston and a screw extruder. Extrusion of a thermosetting material is conducted at a temperature within the range of from 90° to 110° C., while extrusion of a thermoplastic material is conducted at a temperature of from 140° to 170° C. at a speed of the extrudate outflow of from 20 to 300 m/min.

For a better understanding of the present invention some specific examples illustrating its embodiments are given hereinbelow. In these Examples use is made of zinc dialkyldithiophosphate with the alkyl containing 4 to 8 carbon atoms.

EXAMPLE 1

The starting material consisting of a novolac type phenol-formaldehyde resin 42.8% by weight, hexamethylene tetramine 6.5% by weight, lime 0.9% by weight, stearine 0.7% by weight, china clay 4.4% by weight, nigrozin 1.5% by weight and saw flour 43.2% by weight, which material is prepared by rolling or screw plastication, is tested for viscosity in a rotary viscosimeter of the "cylinder-cylinder" type at the temperature of 120° C. and shear rate of 0.014 $sec^{-1}$. This viscosity is $300 \times 10^6$ poises. Then, using the same instrument, there is determined the ratio between internal and external friction values of the melt. It is equal to 1.36. From the value of viscosity of the starting material the amount of a lubricating compound is defined to ensure the required ratio between internal and external friction values. This amount is 2.0% by weight. Then the starting material is mixed with 2.0% by weight of zinc dialkyldithiophosphate in a vane-type mixer and the ratio between internal and external friction values is controlled; it is equal to 3.7. Then the thus-prepared material is granulated in a screw extruder at the temperature of the forming die of 105° C. The material is extruded through the die in the form of a strand at the speed of 20 m/min and then cut along the die plane by means of rotating blades to granules with the diameter of 3 mm and length of 3-4 mm. Substantially no dust fraction is formed therewith. The material is not cured during the granulation which is evidenced by a constant amount of the fraction extracted with acetone prior to granulation (49.6%) and after granulation (49.6%). The thus-produced granules do not agglomerate upon storage.

EXAMPLE 2

The starting material prepared by mixing 58.6% by weight of urea in the form of its mono- and dimethylol-derivatives, 41.0% by weight of sulphite cellulose, 0.4% by weight of zinc stearate is tested for viscosity and ratio between internal and external friction values of the melt in accordance with the procedure described in the foregoing Example 1. These parameters are respectively $250 \times 10^6$ poises and 1.2. Thereafter the starting material is added with 1.8% by weight of a lubricating mixture consisting of 30% by weight of zinc dialkyldithiophosphate and 70% by weight of polyhydroxypropylene glycol and the mixture is blended in a vane-type mixer for 30 minutes. The ratio of frictions is then controlled which is equal to 2.8; at this ratio the material is extruded in a piston extruder at the temperature of the forming die of 95°-100° C. The material is forced through the die in the form of a strand and cut into granules with the diameter of 3 mm and length 3-4 mm; the speed of the extrudate outflow is 180 m/min. No dusting or premature curing of the material is observed. Granules do not agglomerate upon storage.

EXAMPLE 3

Into the starting material similar to that described in the foregoing Example 1 there are added 1.5% by weight of a mixture of 20% of zinc dialkyldithiophosphate and 80% by weight of 2-ethylhexylepoxystearate; then the test for viscosity and friction ratio is performed; these values are equal respectively to $50 \times 10^6$ poises and 1.5. Then the material is extruded following the procedure of Example 1. The extrudate outflow speed is 20 m/min. No dusting or premature curing of the material is observed during granulation. Granules do not agglomerate upon storage.

EXAMPLE 4

The starting material similar to that described in the foregoing Example 1 is tested for viscosity and ratio between internal and external frictions following the procedure of Example 1. Viscosity is $180 \times 10^6$ poises; friction ratio is 1.30. Then the starting material is added with 2% of a mixture of zinc dialkyldithiophosphate (40% by weight) and polyhydroxypropylene glycol (60% by weight) to achieve the required ratio between the internal and external friction values; then the mass is intermixed. Then the friction ratio is controlled; it is equal to 4.0. Further extrusion and cutting of the extrudate to lengths are performed following the procedure of Example 1 hereinbefore. The extrudate outflow speed is 25 m/min. Dusting and premature curing of the material are not observed. Granules do not agglomerate upon storage.

EXAMPLE 5

The starting material with the composition described in the foregoing Example 1 is tested for viscosity and ratio between internal and external friction values following the procedure of Example 1. Viscosity is $250 \times 10^6$ poises, friction ratio is 1.15. Then the starting material is added with zinc dialkyldithiophosphate in the amount of 2.5% by weight and the mass is intermixed in a ball mill for 30 minutes. Then the friction ratio is controlled; it is equal to 3.65. Thereafter the resulting material is extruded and granulated in a manner similar to that described in the foregoing Example 2 at the speed of the extrudate outflow of 240 m/min. No dusting or premature curing of the material is observed. Granules do not agglomerate upon storage.

EXAMPLE 6

The starting material with the composition described in the foregoing Example 2 is tested for viscosity and friction ratio as in Example 1 hereinbefore. Viscosity is $120 \times 10^6$ poises; friction ratio 1.1. Then the starting material is added with 1.2% by weight of zinc dialkyldithiophosphate and the mass is blended. Then the friction ratio is controlled; it is equal to 2.2. Then the thus-prepared material is extruded at the temperature of 90° C. and granulated in a manner similar to that described in Example 2 at the extrudate outflow speed of 120 m/min. No dusting or premature curing of the material is observed.

EXAMPLE 7

The starting material comprising 58.6% by weight of urea in the form of mono- and dimethylol derivatives, 41.0% by weight of sulphite cellulose, 0.4% by weight of zinc stearate, 0.4% by weight of zinc dialkyldithiophosphate and 1.1% by weight of polyoxypropylene glycol is first assayed as to its viscosity, then the ratio of the internal and external friction of its melt is measured by following the procedure similar to that described in Example 1.

The above characteristics are $175 \times 10^6$ poises and 1.7 respectively.

Since the initial material meets the requirements of the herein proposed method, said material is directly extruded by following the procedure described in Example 2 at a temperature of 95° C. and extrudate outflow of 170 m/min, and granulated.

No dusting or premature curing of the material is observed. The granulate does not agglomerate into lumps upon storage.

EXAMPLE 8

Into the starting material consisting of 70% by weight of polyethylene and 30% by weight of saw dust and having the melt index value of 0.08 g/10 min and ratio between internal and external friction of the melt at the temperature of 160° C. of 1.14 0.5% by weight of barium sulphonate is added to increase the friction ratio. After incorporation of barium sulphonate this ratio is increased to 1.75 and with this ratio extrusion of said composition is performed in a piston extruder at the temperature of 160° C. The speed of the extrudate outflow is 125 m/min; the extrudate is obtained in the shape of cylindrical strands having a smooth surface.

EXAMPLE 9

Into the starting material consisting of 75% by weight of polyethylene and 25% by weight of saw dust and having the melt index of 0.07 g/10 min and ratio between internal and external friction values of the material melt of 1.4 at the temperature of 160° C. calcium sulphonate is added in the amount of 1% by weight to increase the above-mentioned friction ratio. After incorporation of calcium sulphonate this ratio is increased to 2.7. At this ratio extrusion of said composition is performed following the procedure of Example 7. The speed of the extrudate outflow is 150 m/min. The extrudate is obtained in the shape of cylindrical strands having a smooth surface.

EXAMPLE 10

A composition containing polyethylene partly pre-reticuiated by a chemical or physical method with the gel-fraction content of 58% by weight, and barium sulphonate in the amount of 1% by weight with the melt index of 0.09 g/10 min and ratio between internal and external friction values of 3 is extruded in a piston extruder provided with a pipe-forming die at the temperature of 140° C. The speed of the extrudate outflow is 80 m/min. The extrudate shape is tubular; the thus-manufactured pipes have a smooth surface.

EXAMPLE 11

A composition containing 49% of polypropylene, 50% by weight of synthetic silica and 1% by weight of calcium sulphonate with the melt index of 0.05 g/10 min and ratio between internal and external friction values of 3.2 is extruded in a piston extruder at the temperature of 170° C. The speed of the extrudate outflow in the form of a strand is 240 m/min. The thus-produced strands have a smooth surface.

EXAMPLE 12

Extruded is a composition consisting of 58% by weight of polyethylene, 40% by weight of saw dust and 2% by weight of barium sulphonate with the melt index of 0.01 g/10 min and ratio between internal and external friction values of 4.0. The extrusion is performed in a piston extruder at the temperature of 160° C. The speed of the extrudate outflow is 180 m/min. The extrudate has a hexagonal shape and a smooth surface.

EXAMPLE 13

A composition containing 66% by weight of polyvinylchloride, 15% by weight of aerosil, 6% by weight of shellac, 12% by weight of synthetic rubber and 1% by weight of calcium sulphonate and having melt index of 0.1 g/10 min and ratio between internal and external friction values of the melt thereof of 1.8 is extruded in a piston extruder at the temperature of 140° C. The speed of the extrudate outflow in the shape of a pipe is 20 m/min. The thus-produced extrudate has a smooth surface.

We claim:

1. A method for extrusion of a highly viscous thermosetting or thermoplastic resin material comprising determining the melt viscosity of a selected thermosetting resin material or melt index of a selected thermoplastic resin material and the ratio of internal and external friction values of said selected material; adding substances to said material to diminish the external friction of the selected material until said ratio is within the range of from 1.5 to 4.0 when said ratio of the selected material initially falls outside said range; in the case of a thermosetting resin material, adjusting the melt viscosity of the thermosetting resin material to a viscosity in the range of from $50 \times 10^6$ to $300 \times 10^6$ poises when said melt viscosity of the selected thermosetting resin material initially falls outside said range, in the case of a thermoplastic resin material adjusting the melt index of the selected thermoplastic resin material to a melt index in the range of from 0.1 to 0.01 g/10 min. when said melt index of the selected thermoplastic resin material initially falls outside said range and extruding the material at a rate in the range of 20 to 300 m/min.

2. A method according to claim 1, wherein extrusion of a thermosetting material is performed with an addition thereinto of zinc dialkyldithiophosphate in an amount of from 0.5 to 2.5% by weight.

3. A method according to claim 1, wherein extrusion of a thermosetting material is conducted with an addition thereinto a mixture of zinc dialkyldithiophosphate and epoxystearic acid 2-ethylhexylate in a ratio of from 20–50: to 80–50 and in an amount of from 0.5 to 2.5% by weight.

4. A method according to claim 1 and wherein extrusion of a thermoplastic material is conducted with an addition thereinto a mixture of a mixture of zinc dialkyldithiophosphate and polyhydroxypropylene glycol in a ratio of from 30–50: to 70–50 and in an amount of from 0.5 to 2.5% by weight.

5. A method according to claim 1, wherein extrusion of a thermoplastic material is performed with an addition thereinto of barium sulphonate in an amount ranging from 0.5 to 2.0% by weight.

6. A method according to claim 1, wherein extrusion of a thermoplastic material is conducted with an addition thereinto of calcium sulphonate in an amount ranging from 0.5 to 2.0% by weight.

7. A method according to claim 1, wherein extrusion of a thermosetting material is conducted at a temperature within the range of from 90° to 110° C.

8. A method according to claim 1, wherein extrusion of a thermoplastic material is conducted at a temperature within the range of from 140° to 170° C.

* * * * *